United States Patent
Propheter-Hinckley

(10) Patent No.: US 10,428,663 B2
(45) Date of Patent: Oct. 1, 2019

(54) AIRFOIL WITH TIE MEMBER AND SPRING

(71) Applicant: United Technologies Corporation, Farmington, CT (US)

(72) Inventor: Tracy A. Propheter-Hinckley, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 396 days.

(21) Appl. No.: 15/354,150

(22) Filed: Nov. 17, 2016

(65) Prior Publication Data

US 2018/0135442 A1    May 17, 2018

(51) Int. Cl.
*F01D 9/02* (2006.01)
*F01D 5/18* (2006.01)
(Continued)

(52) U.S. Cl.
CPC ............. *F01D 9/02* (2013.01); *F01D 5/18* (2013.01); *F01D 5/284* (2013.01); *F01D 5/3084* (2013.01);
(Continued)

(58) Field of Classification Search
CPC ... F01D 9/02; F01D 9/04; F01D 9/041; F01D 9/042; F01D 9/044; F01D 5/18;
(Continued)

(56) References Cited

U.S. PATENT DOCUMENTS

| 3,215,511 A | 11/1965 | Chisholm |
| 4,137,008 A | 1/1979 | Grant et al. |

(Continued)

FOREIGN PATENT DOCUMENTS

| EP | 0764764 | 3/1997 |
| EP | 1764481 | 3/2007 |

(Continued)

OTHER PUBLICATIONS

U.S. Appl. No. 13/429,474, filed Mar. 26, 2012.
(Continued)

*Primary Examiner* — Christopher Verdier
*Assistant Examiner* — Elton K Wong
(74) *Attorney, Agent, or Firm* — Carlson, Gaskey & Olds, P.C.

(57) ABSTRACT

An airfoil includes an airfoil section that has an internal cavity and first and second endwall sections between which the airfoil section is disposed. The first endwall section includes a guide portion that has a guide opening flanked by first and second bearing lands. The first bearing land is between the guide opening and a first port in the first endwall section that opens to the internal cavity of the airfoil section. The second bearing land is between the guide opening and a second port in the first endwall section that also opens to the internal cavity. A tie member extends through the internal cavity and secures the first and second endwall sections together to trap the airfoil section. The tie member extends through the guide opening in the first endwall section. A spring member on the first and second bearing lands tensions the tie member.

20 Claims, 3 Drawing Sheets

(51) Int. Cl.
*F01D 11/00* (2006.01)
*F04D 29/08* (2006.01)
*F04D 29/32* (2006.01)
*F04D 29/54* (2006.01)
*F01D 5/28* (2006.01)
*F01D 5/30* (2006.01)
*F01D 9/04* (2006.01)
*F01D 25/24* (2006.01)

(52) U.S. Cl.
CPC .......... *F01D 5/3092* (2013.01); *F01D 9/041* (2013.01); *F01D 9/042* (2013.01); *F01D 9/044* (2013.01); *F01D 11/003* (2013.01); *F01D 25/246* (2013.01); *F04D 29/083* (2013.01); *F04D 29/324* (2013.01); *F04D 29/542* (2013.01); *F05D 2220/32* (2013.01); *F05D 2230/51* (2013.01); *F05D 2230/60* (2013.01); *F05D 2240/10* (2013.01); *F05D 2240/12* (2013.01); *F05D 2240/35* (2013.01); *F05D 2240/80* (2013.01); *F05D 2260/52* (2013.01); *F05D 2300/10* (2013.01); *F05D 2300/20* (2013.01); *F05D 2300/21* (2013.01); *Y02T 50/672* (2013.01)

(58) Field of Classification Search
CPC . F01D 5/28; F01D 5/282; F01D 5/284; F04D 29/083; F04D 29/324; F04D 29/542; F05D 2230/51; F05D 2230/60; F05D 2300/21; F05D 2300/603; F05D 2300/6033; F05D 2240/10; F05D 2240/12; F05D 2240/80; F05D 2260/52; Y02T 50/672
See application file for complete search history.

(56) References Cited

U.S. PATENT DOCUMENTS

| | | | |
|---|---|---|---|
| 4,247,259 A | 1/1981 | Saboe et al. | |
| 4,396,349 A * | 8/1983 | Hueber | F01D 5/284 415/115 |
| 4,914,794 A | 4/1990 | Strangman | |
| 5,358,379 A | 10/1994 | Pepperman et al. | |
| 5,538,380 A | 7/1996 | Norton et al. | |
| 5,630,700 A * | 5/1997 | Olsen | F01D 5/189 415/134 |
| 5,681,616 A | 10/1997 | Gupta et al. | |
| 5,705,231 A | 1/1998 | Nissley et al. | |
| 5,951,892 A | 9/1999 | Wolfla et al. | |
| 6,000,906 A * | 12/1999 | Draskovich | F01D 5/3084 415/189 |
| 6,102,656 A | 8/2000 | Nissley et al. | |
| 6,224,963 B1 | 5/2001 | Strangman | |
| 6,316,078 B1 | 11/2001 | Smialek | |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,703,137 B2 | 3/2004 | Subramanian | |
| 6,709,230 B2 | 3/2004 | Morrison et al. | |
| 6,846,574 B2 | 1/2005 | Subramanian | |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 | 11/2008 | Vance et al. | |
| 7,520,725 B1 | 4/2009 | Liang | |
| 7,670,116 B1 | 3/2010 | Wilson, Jr. et al. | |
| 7,963,745 B1 | 6/2011 | Liang | |
| 8,079,806 B2 | 12/2011 | Tholen et al. | |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 | 8/2012 | Propheter-Hinckley et al. | |
| 8,366,392 B1 | 2/2013 | Laing | |
| 8,480,366 B2 | 7/2013 | Malecki et al. | |
| 8,506,243 B2 | 8/2013 | Strock et al. | |
| 8,821,124 B2 | 9/2014 | Viens et al. | |
| 2008/0159850 A1 | 7/2008 | Tholen et al. | |
| 2010/0136258 A1 | 6/2010 | Strock et al. | |
| 2016/0090851 A1 | 3/2016 | Carr et al. | |
| 2016/0123163 A1* | 5/2016 | Freeman | F01D 25/005 415/200 |
| 2016/0123164 A1* | 5/2016 | Freeman | F01D 25/005 415/200 |

FOREIGN PATENT DOCUMENTS

| | | |
|---|---|---|
| EP | 2105579 | 9/2009 |
| EP | 2853688 | 4/2015 |
| EP | 3000979 | 3/2016 |
| GB | 2250782 | 6/1992 |
| GB | 2272453 | 5/1994 |
| JP | S60209604 | 10/1985 |
| JP | 61066802 | 4/1986 |
| JP | 05321602 | 12/1993 |
| WO | 9913201 | 3/1999 |

OTHER PUBLICATIONS

U.S. Appl. No. 14/659,718, filed Mar. 17, 2015.
U.S. Appl. No. 14/812,668, filed Jul. 29, 2015.
Extended European Search Report for EP Application No. 17202240.2, dated May 29, 2018.

* cited by examiner

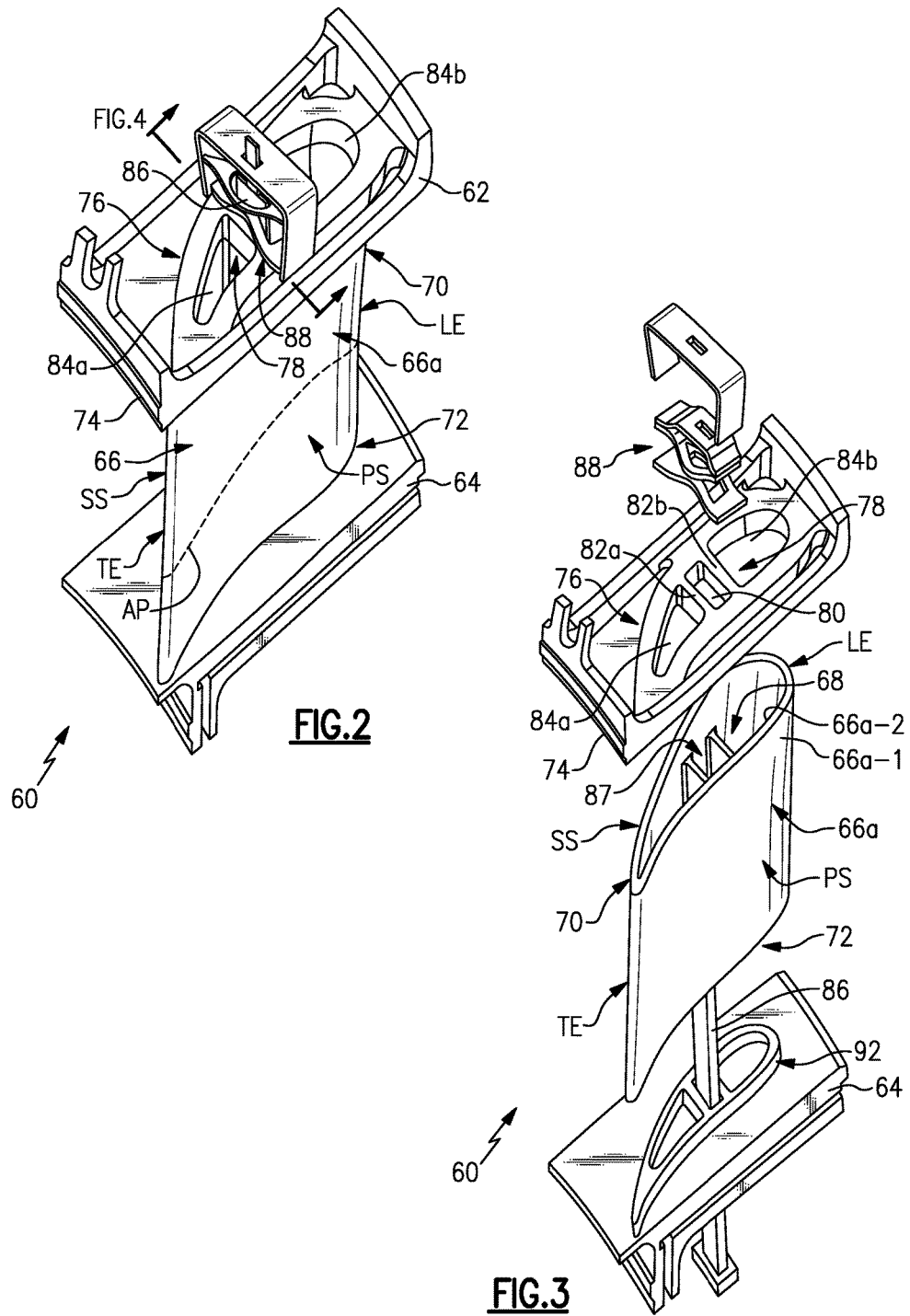

AIRFOIL WITH TIE MEMBER AND SPRING

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil section that has an internal cavity and first and second endwall sections between which the airfoil section is disposed. The first endwall section includes a guide portion that has a guide opening that is flanked by first and second bearing lands. The first bearing land is disposed between the guide opening and a first port in the first endwall section. The first port opens to the internal cavity of the airfoil section, and the second bearing land is disposed between the guide opening and a second port in the first endwall section. The second port opens to the internal cavity of the airfoil section. There is a tie member that extends through the internal cavity of the airfoil section and secures the first and second endwall sections together to trap the airfoil section there between. The tie member extends through the guide opening in the first endwall section. A spring member is disposed on the first and second bearing lands. The spring member tensions the tie member.

In a further embodiment of any of the foregoing embodiments, the first and second endwall sections are metal and the airfoil section is ceramic.

In a further embodiment of any of the foregoing embodiments, the spring member includes a mechanical spring.

In a further embodiment of any of the foregoing embodiments, the spring member includes a thermal spring.

In a further embodiment of any of the foregoing embodiments, the spring member includes a leaf spring.

A further embodiment of any of the foregoing embodiments includes a cover having a base wall and a pair of arms projecting from the base wall. The tie member is secured to the base wall.

In a further embodiment of any of the foregoing embodiments, the base wall and the arms define an interior region, and the spring member is diposed in the interior region.

In a further embodiment of any of the foregoing embodiments, the spring member is spaced apart from the arms.

In a further embodiment of any of the foregoing embodiments, each of the arms includes a bearing surface against which the spring member moves when compressed.

In a further embodiment of any of the foregoing embodiments, the first endwall section includes a seal lip that fits into the airfoil section and seals the internal cavity from an exterior of the airfoil section.

In a further embodiment of any of the foregoing embodiments, the airfoil section includes a guide channel in the internal cavity, through which the tie member extends.

A further embodiment of any of the foregoing embodiments includes a cover having a base wall and a pair of arms projecting from the base wall. The tie member is secured to the base wall. The base wall and the arms define an interior region. The first and second endwall sections are metal. The airfoil section is ceramic, and the spring member includes a leaf spring diposed in the interior region of the cover.

In a further embodiment of any of the foregoing embodiments, each of the arms includes a bearing surface against which the spring member moves when compressed, and the first endwall section includes a seal lip that fits into the airfoil section and seals the internal cavity from an exterior of the airfoil section.

A gas turbine engine according to an example of the present disclosure include a compressor section, a combustor in fluid communication with the compressor section, and a turbine section in fluid communication with the combustor. One of the turbine section or the compressor section includes an airfoil that has an airfoil section that has an internal cavity and first and second endwall sections between which the airfoil section is disposed. The first endwall section includes a guide portion that has a guide opening that is flanked by first and second bearing lands. The first bearing land is disposed between the guide opening and a first port in the first endwall section. The first port opens to the internal cavity of the airfoil section, and the second bearing land is disposed between the guide opening and a second port in the first endwall section. The second port opens to the internal cavity of the airfoil section. There is a tie member that extends through the internal cavity of the airfoil section and secures the first and second endwall sections together to trap the airfoil section there between. The tie member extends through the guide opening in the first endwall section. A spring member is disposed on the first and second bearing lands. The spring member tensions the tie member.

A further embodiment of any of the foregoing embodiments includes a cover having a base wall and a pair of arms projecting from the base wall. The tie member is secured to the base wall. The base wall and the arms define an interior region. The first and second endwall sections are metal. The airfoil section is ceramic, and the spring member includes a leaf spring diposed in the interior region of the cover.

In a further embodiment of any of the foregoing embodiments, each of the arms includes a bearing surface against which the spring member moves when compressed, and the first endwall section includes a seal lip that fits into the airfoil section and seals the internal cavity from an exterior of the airfoil section.

An airfoil according to an example of the present disclosure includes a ceramic airfoil section that has an internal cavity, and first and second metal endwall sections between which the ceramic airfoil section is disposed. The first metal endwall section includes a guide portion that has a guide opening that is flanked by first and second bearing lands. A seal lip fits into the ceramic airfoil section and seals the internal cavity from an exterior of the ceramic airfoil section. A metal tie member extends through the internal cavity of the ceramic airfoil section and secures the first and second metal endwall sections together to trap the ceramic airfoil section there between. The metal tie member extends through the guide opening in the first metal endwall section, and a spring member is disposed on the first and second bearing lands. The spring member tensions the metal tie member.

In a further embodiment of any of the foregoing embodiments, the seal lip projects into the internal cavity.

In a further embodiment of any of the foregoing embodiments, the ceramic airfoil section includes an exterior surface and an interior surface, and the seal lip abuts the interior surface.

A further embodiment of any of the foregoing embodiments includes a cover having a base wall and a pair of arms projecting from the base wall, wherein the metal tie member is secured to the base wall, the base wall and the arms define an interior region, the spring member includes a leaf spring diposed in the interior region of the cover, and each of the arms includes a bearing surface against which the spring member moves when compressed.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2 illustrates an example airfoil from the gas turbine engine of FIG. 1.

FIG. 3 illustrates an expanded view of the airfoil of FIG. 2.

DETAILED DESCRIPTION

Figure 1:
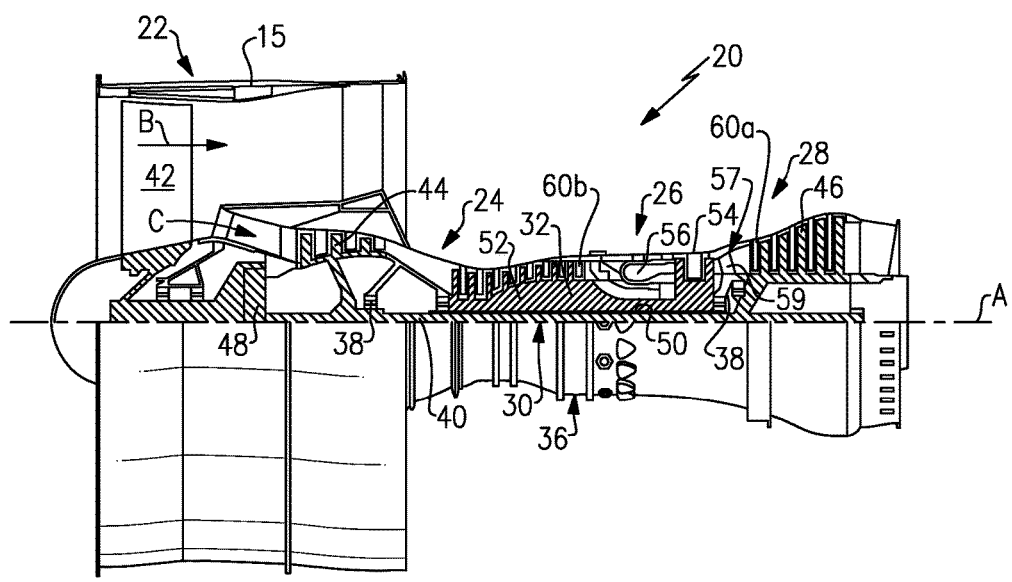
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second.

In gas turbine engines air is often bled from the compressor for cooling alloy components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

FIG. 2 illustrates selected portions of one such component, namely an airfoil 60. FIG. 3 illustrates an expanded view of the airfoil 60. For instance, the airfoil 60 can be a turbine vane, as represented at 60a in FIG. 1, or a compressor vane, as represented at 60b in FIG. 1. As will be appreciated, although the examples herein are described in the context of a vane, this disclosure is not limited to vanes, and the examples may also be applicable to blades or other airfoils.

In this example, the airfoil 60 includes first and second endwall sections 62/64 and an airfoil section 66 that is positioned radially between the endwall sections 62/64. The airfoil section 66 defines an airfoil profile (AP), which is the peripheral shape of the airfoil section 66 when viewed in a radial direction. For example, the airfoil profile has a wing-like shape that provides a reaction force via Bernoulli's principle with regard to flow over the airfoil section 66.

The airfoil profile (AP) generally includes a leading end (LE), a trailing end (TE), a pressure side (PS), and a suction side (SS). For example, the leading end (LE) is the region of the airfoil profile (AP) that includes a leading edge of the airfoil profile (AP). The leading edge may be the portion of the airfoil profile (AP) that first contacts air or the foremost edge of the airfoil profile (AP). For a variable vane, the leading edge may shift, depending on the orientation of the vane. In the illustrated example, the wall or walls 66a of the core structure 62 form the leading end (LE), the trailing end (TE), and the suction side (SS), and the panel 64a forms the pressure side (PS) or a portion thereof. As will be appreciated, the panel 64a could alternatively form a different portion of the airfoil profile (AP), or an additional panel or panels could be used to form other portions of the airfoil profile (AP).

The airfoil section 66 is formed of one or more walls 66a. The wall or walls 66a have an exterior surface 66a-1 and an interior surface 66a-2. The airfoil section 66 includes an internal cavity 68, which may be open or divided into sub-cavities. The airfoil section 66 spans between first and second airfoil section ends 70/72 that interlock with, respectively, the first and second endwall sections 62/64 such that the airfoil section 66 is retained there between.

At least the first endwall section 62 includes a platform portion 74. In this example, the second endwall section 64 also includes a platform portion 74. Together, the platform portions form the inner and outer boundaries of the core gas path. The platform portion 74 generally encompasses a mounting portion 76. The mounting portion 76 includes a guide portion 78 that has a guide opening 80. The guide opening 80 is flanked (fore and aft) by first and second bearing lands 82a/82b. The first bearing land 82a is between the guide opening 80 and a first port 84a in the first endwall section 62. The first port 84a opens to the internal cavity 68 of the airfoil section 66. The second bearing land 82b is between the guide opening 80 and a second port 84b in the first endwall section 62. The second port 84b also opens to the internal cavity 68 of the airfoil section 66.

A tie member 86 extends through the internal cavity 68 of the airfoil section 66 and secures the first and second endwall sections 62/64 together to trap or clamp the airfoil section 66 there between. The tie member 86 extends through the guide opening 80 in the first endwall section 62. In this example, the tie member 86 likewise extends through the guide opening in the second endwall section 64, although the tie member 86 may be secured to the second endwall section 64 by other fastening techniques, such as but not limited to threaded connection, bolted connection, weld, or the like. Optionally, the airfoil section 66 may include a guide channel 87 through which the tie member 86 is received. The guide channel 87 may be defined by continuous side walls that extend along the interior surface 66a-2 in the internal cavity 68 of the airfoil section 66. Alternatively, the guide channel 87 may be defined by two parallel rows of projections that protrude from the interior surface 66a-2 of the airfoil section 66. The guide channel 87 may be used to properly align the tie member 86.

In the examples herein, the airfoil section 66 may be formed of ceramic, to provide thermal and/or environmental resistance. The ceramic may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. In further examples, the ceramic is a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

The airfoil section 66 may additionally or alternatively be coated with a thermal and/or environmental barrier ceramic coating, such as but not limited to a segmented barrier coating. As an example, the ceramic coating may include or may be oxides, carbides, nitrides, borides, silicides, or combinations thereof. In further examples, the ceramic coating may be or may include yttria stabilized with zirconia, hafnia, and/or gadolinia, gadolinia zirconate, molybdate, alumina, or combinations thereof.

The endwall sections 62/64 and the tie member 86 may be formed of a metal, such as an alloy. Example alloys may include, but are not limited to, nickel alloys, cobalt alloys, a nickel alloy coated with cobalt or cobalt alloy, or a non-nickel alloys that do not substantially react with ceramic.

A spring member 88 is disposed on the first and second bearing lands 82a/82b. The spring member 88 tensions the tie member 86 and, in particular, accommodates the differences in coefficient of thermal expansion of the endwall sections 62/64, the airfoil section 66, and the tie member 86 due to the use of the ceramic and metal for these components. Over the range of temperatures that the airfoil 60 is exposed during use, the difference in coefficient of thermal expansion may cause one or more of these components to grow or shrink more than another of the components. Such a difference in growth or shrinkage may loosen the clamping force provided by the tie member 86 or exert an undue amount of force on one or more of the components. In this regard, the spring member 88 expands or contracts to keep the tie member 86 under tension by taking up the difference in thermal growth/shrinkage. Thus, the spring member 88 maintains a proper clamping tension over the range of temperatures that the airfoil 60 is exposed during use.

Figure 4:
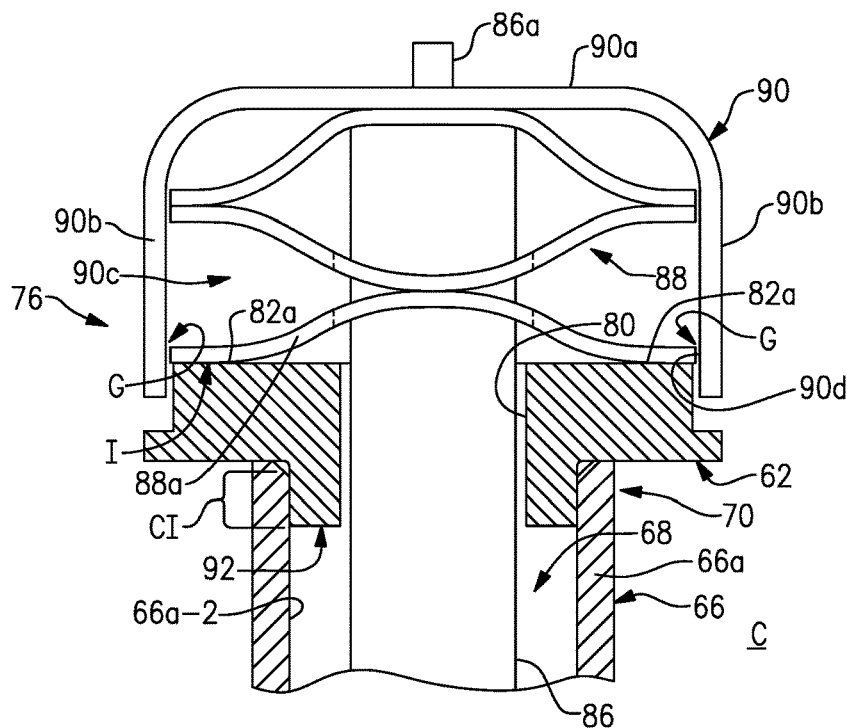
FIG. 4 illustrates a sectioned view of a portion of the airfoil of FIG. 2.

FIG. 4 illustrates a sectioned view through a portion of the mounting portion 76 of the first endwall section 62. In this example, the tie member 86 extends through the guide opening 80 and is secured to a cover 90. For instance, the tie member 86 includes a tang 86a that is bonded, such as by welding or brazing, to the cover 90. The cover 90 includes a base wall 90a and a pair of arms 90b that project from the base wall 90a. The base wall 90a and the arms 90b define an interior region 90c in which the spring member 88 is disposed.

In this example, the spring member 88 is a mechanical spring and, specifically is a leaf spring. The spring member 88 includes one or more leaves 88a that abut or bear against the bearing lands 82a/82b over a bearing interface (I). The spring member 88 slides along the bearing lands 82a/82b upon compression and contraction of the spring member 88.

In this example, the spring member 88 (at rest or in a contracted state) is spaced apart from arms 90b such that there is a defined gap G between the tips of the leaf 88a and bearing surfaces 90d of the arms 90b. Upon compression of the spring member 88, the leaf 88a expands outwards such that the opposed tips of the leaf 88a spread apart. The leaf 88a can be compressed, and thus expanded, until the tips of the leaf 88a contact the bearing surfaces 90d of the arms 90b. The arms 90b stop the leaf 88a from expanding further. The cover 90 thus serves as a stop for the spring member 88 and can thus be used to tailor the response of the spring member 88. Alternatively, the thickness, and thus flexibility, of the arms 90b can be altered such that the arms 90b serve as a secondary spring that modifies the spring response. For instance, there is a first spring response dictated by the spring constant of the spring member 88 prior to contacting the arms 90b. Upon contacting the arms 90b, there is a second spring rate dictated by the different spring constant of the arms 90b.

The cover 90 may also serve as a thermal barrier, to shield the spring member 88 and tie member 86 from thermal transients. Although the cover 90 may be used to serve these described functions, modified examples may exclude the cover 90 in favor of a fastener, such as a nut, or other securing attachment to the tie member 86.

The view in FIG. 4 also shows a seal lip 92 of the first endwall section 62 (an equivalent seal lip 92 is also shown on the second endwall section 64 in FIG. 3). The seal lip 92 generally has the same airfoil profile as the airfoil section 66, but is smaller such that the seal lip 92 fits into the airfoil section 66. For example, as shown, the seal lip 92 projects into the internal cavity 68 in the airfoil section 66 and seal with the interior surface 66a-2 of the wall 66a of the airfoil section 66. For example, the seal lip 92 may abut the interior surface 66a-2 along an interface CI, although there may be some space between the seal lip 92 and the interior surface 66a-2 to accommodate fabrication tolerances and thermal growth/shrinkage. The seal lip 92 and the end 70 of the airfoil section 66 thus form a shiplap seal which seals the internal cavity 68 of the airfoil section 66 from the exterior core gas path C.

Figure 5:
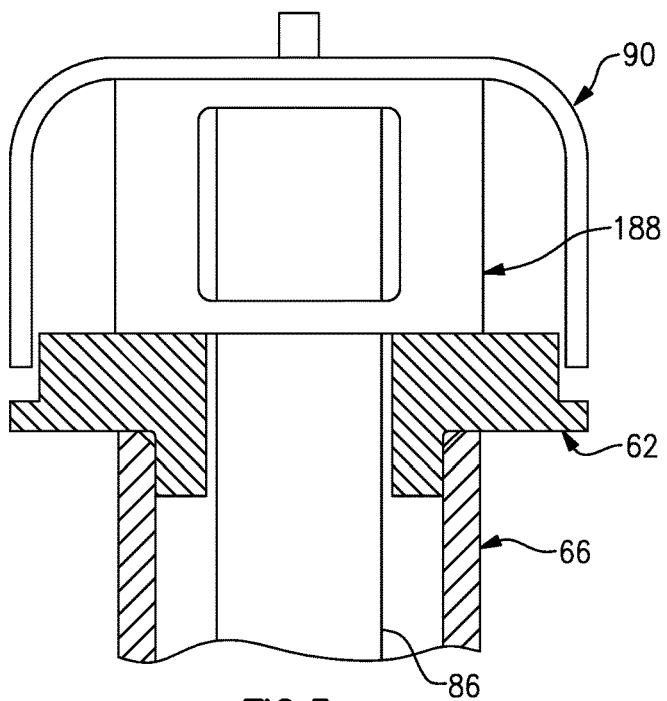
FIG. 5 illustrates a modified example having a thermal spring.

FIG. 5 illustrates a modified example in which the airfoil 60 includes spring member 188. In this example, the spring member 188 is a thermal spring rather than a mechanical spring. For instance, the spring member 188 is configured to thermally grow and shrink over the exposure temperature range of interest in substantially equal amount as the tie member 86. In one example, the coefficients of thermal expansion of the spring member 188 and the tie member may be substantially equal. In another example, due to the difference in size of the spring member 188 and the tie member 96, the coefficients are selected to be different to account for the size difference. The spring member 188 thus expands or contracts in a similar absolute amount to the to keep the tie member 86 under tension by taking up the difference in thermal growth/shrinkage between the tie member 86, the endwall sections 62/64, and the airfoil section 66.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   an airfoil section including an internal cavity;
   first and second endwall sections between which the airfoil section is disposed, the first endwall section including a guide portion having a guide opening that is flanked by first and second bearing lands, the first bearing land being disposed between the guide opening and a first port in the first endwall section, the first port opening to the internal cavity of the airfoil section, and the second bearing land being disposed between the guide opening and a second port in the first endwall section, the second port opening to the internal cavity of the airfoil section;
   a tie member extending through the internal cavity of the airfoil section and securing the first and second endwall sections together to trap the airfoil section there between, the tie member extending through the guide opening in the first endwall section; and
   a spring member disposed on the first and second bearing lands, the spring member tensioning the tie member.

2. The airfoil as recited in claim 1, wherein the first and second endwall sections are metal and the airfoil section is ceramic.

3. The airfoil as recited in claim 1, wherein the spring member includes a mechanical spring.

4. The airfoil as recited in claim 1, wherein the spring member includes a thermal spring.

5. The airfoil as recited in claim 1, wherein the spring member includes a leaf spring.

6. The airfoil as recited in claim 1, further comprising a cover having a base wall and a pair of arms projecting from the base wall, wherein the tie member is secured to the base wall.

7. The airfoil as recited in claim 6, wherein the base wall and the arms define an interior region, and the spring member is disposed in the interior region.

8. The airfoil as recited in claim 7, wherein the spring member is spaced apart from the arms.

9. The airfoil as recited in claim 7, wherein each of the arms includes a bearing surface against which the spring member moves when compressed.

10. The airfoil as recited in claim 1, wherein the first endwall section includes a seal lip that fits into the airfoil section and seals the internal cavity from an exterior of the airfoil section.

11. The airfoil as recited in claim 1, wherein the airfoil section includes a guide channel in the internal cavity, through which the tie member extends.

12. The airfoil as recited in claim 1, further comprising a cover having a base wall and a pair of arms projecting from the base wall, wherein the tie member is secured to the base wall, the base wall and the arms define an interior region, the first and second endwall sections are metal, the airfoil section is ceramic, and the spring member includes a leaf spring disposed in the interior region of the cover.

13. The airfoil as recited in claim 12, wherein each of the arms includes a bearing surface against which the spring member moves when compressed, and the first endwall section includes a seal lip that fits into the airfoil section and seals the internal cavity from an exterior of the airfoil section.

14. A gas turbine engine comprising:
a compressor section;
a combustor in fluid communication with the compressor section; and
a turbine section in fluid communication with the combustor,
at least one of the turbine section or the compressor section including an airfoil having an airfoil section including an internal cavity,
first and second endwall sections between which the airfoil section is disposed, the first endwall section including a guide portion having a guide opening that is flanked by first and second bearing lands, the first bearing land being disposed between the guide opening and a first port in the first endwall section, the first port opening to the internal cavity of the airfoil section, and the second bearing land being disposed between the guide opening and a second port in the first endwall section, the second port opening to the internal cavity of the airfoil section,
a tie member extending through the internal cavity of the airfoil section and securing the first and second endwall sections together to trap the airfoil section there between, the tie member extending through the guide opening in the first endwall section, and
a spring member disposed on the first and second bearing lands, the spring member tensioning the tie member.

15. The gas turbine engine as recited in claim 14, further comprising a cover having a base wall and a pair of arms projecting from the base wall, wherein the tie member is secured to the base wall, the base wall and the arms define an interior region, the first and second endwall sections are metal, the airfoil section is ceramic, and the spring member includes a leaf spring disposed in the interior region of the cover.

16. The gas turbine engine as recited in claim 15, wherein each of the arms includes a bearing surface against which the spring member moves when compressed, and the first endwall section includes a seal lip that fits into the airfoil section and seals the internal cavity from an exterior of the airfoil section.

17. An airfoil comprising:
a ceramic airfoil section including an internal cavity;
first and second metal endwall sections between which the ceramic airfoil section is disposed, the first metal endwall section including
a guide portion having a guide opening that is flanked by first and second bearing lands, and
a seal lip that fits into the ceramic airfoil section and seals the internal cavity from an exterior of the ceramic airfoil section;
a metal tie member extending through the internal cavity of the ceramic airfoil section and securing the first and second metal endwall sections together to trap the ceramic airfoil section there between, the metal tie member extending through the guide opening in the first metal endwall section; and
a spring member disposed on the first and second bearing lands, the spring member tensioning the metal tie member.

18. The airfoil as recited in claim 17, wherein the seal lip projects into the internal cavity.

19. The airfoil as recited in claim 17, wherein the ceramic airfoil section includes an exterior surface and an interior surface, and the seal lip abuts the interior surface.

20. The airfoil as recited in claim 17, further comprising a cover having a base wall and a pair of arms projecting from the base wall, wherein the metal tie member is secured to the base wall, the base wall and the arms define an interior region, the spring member includes a leaf spring disposed in the interior region of the cover, and each of the arms includes a bearing surface against which the spring member moves when compressed.

\* \* \* \* \*